US006827380B2

(12) United States Patent
White

(10) Patent No.: US 6,827,380 B2
(45) Date of Patent: Dec. 7, 2004

(54) MANIPULATING HAND FOR HANDLING A WIRE MATERIAL

(75) Inventor: Dale White, Hampshire, IL (US)

(73) Assignee: Peerless Enterprises, Inc.

( * ) Notice: Subject to any disclaimer, the term of this patent is extended or adjusted under 35 U.S.C. 154(b) by 77 days.

(21) Appl. No.: 10/628,095

(22) Filed: Nov. 12, 2002

(65) Prior Publication Data

US 2004/0090074 A1 May 13, 2004

(51) Int. Cl.[7] .................................................. B25J 1/00
(52) U.S. Cl. .......................... 294/19.1; 294/25; 294/26
(58) Field of Search .............................. 294/19.1, 19.3, 294/25, 26, 11, 15; 140/123, 123.5; 256/1, 11, 37

(56) References Cited

U.S. PATENT DOCUMENTS 929,173 A * 7/1909 Stone .......................... 294/26
2,135,232 A * 11/1938 Dawn .......................... 294/11
2,891,811 A * 6/1959 Strickler .................... 294/19.1
2,989,334 A * 6/1961 Browne ..................... 294/19.1
3,183,031 A * 5/1965 Haberstick ................. 294/19.1
4,264,055 A * 4/1981 Strange ...................... 254/243
4,377,906 A * 3/1983 Bertellotti et al. ............ 294/15
4,377,907 A * 3/1983 Bertellotti et al. ............ 294/15
4,645,253 A * 2/1987 Hogden et al. ............ 294/19.1
4,993,766 A * 2/1991 Sutherland ................. 294/19.1
5,056,842 A * 10/1991 Lindenberg et al. ....... 294/19.1
5,154,465 A * 10/1992 Pakosh ...................... 294/50.8
5,348,359 A * 9/1994 Boozer ........................ 294/24
5,380,054 A * 1/1995 Galvis ........................ 294/1.4
5,570,919 A * 11/1996 Eusebe ...................... 294/19.1
5,893,799 A * 4/1999 Studley et al. ............. 463/47.2
6,499,778 B2 * 12/2002 Boulay ...................... 294/19.1

* cited by examiner

*Primary Examiner*—Paul T. Chin
(74) *Attorney, Agent, or Firm*—Robert L. Marsh

(57) ABSTRACT

A manipulating arm has an inward end configured as a sleeve for fitting around the forearm of an operator and an outward end having a tubular projection with an axially moving rod slideable therein. The rod has a hook at the outward end thereof for grasping razor ribbon, and is moveable between a retracted position and an extended position and is urged to the extended position by a spring. The distal end of the rod extends from the outward tubular member and is configured as a hook. The device includes a handle oriented perpendicular to the axis of the tube and a moveable trigger that can be grasped by the fingers of the operator while his palm is against the handle. Retracting the trigger retracts the rod within the tubular member, compresses the spring, and closes the hook of the claw around a piece of razor ribbon so that it can be positioned by the operator.

11 Claims, 3 Drawing Sheets

MANIPULATING HAND FOR HANDLING A WIRE MATERIAL

The present invention relates to an apparatus for facilitating the installation of protective razor wire barriers and the like to protect the boundaries of property from human invasion.

BACKGROUND OF THE INVENTION

Barbed wire, developed for the purpose of fencing in animals, has also been used as part of a security barrier to protect against unauthorized human entry into protected sites. Nuclear facilities, water purification facilities, electric power generating facilities and the like all have long exterior unguarded boundaries which may become a temptation to potential invaders whose purposes may range from simple curiosity, to pranksters, to terrorism. Since human invaders are far more resourceful than animals, the protection of such unguarded boundaries requires greater sophistication than the stringing of simple barbed wire.

It has become common to use razor ribbon, a long helical coil of barbed metal tape to protect unguarded boundaries from human invasion. The coils of razor ribbon come in several diameters, ranging from eighteen inches to sixty inches and the coil metal tape has razor sharp barbs positioned at intervals of four to six inches along the circumference of the coils. When installed, the loops of the coils are spaced from one another only a few inches such that numerous barbs on the coil will obstruct the path of any invader.

The razor wire not only presents a danger to potential invaders, it is difficult to install because the wire must be uncoiled, stretched, and held in place until it is retained where desired by wire tie-downs positioned along its length. It is common for the installers to use gloves, but the razor sharp prongs easily penetrate the gloves and every installer of razor wire has suffered a multitude of wounds. There is therefore a need for improvements in the tools and methods used for installing razor wire.

SUMMARY OF THE INVENTION

Briefly, the present invention is embodied in a manipulating claw, which will substitute for an installer's hand, for grasping the coils of razor wire. The claw is mounted on an elongate member having a longitudinal axis and means for retaining the longitudinal member parallel to the forearm of an operator. The longitudinal member therefore becomes an extension of the operator's forearm and the manipulator claw at the distal end thereof becomes a mechanical substitute for the operator's hand.

To avoid injury an operator will employ two manipulator arms in accordance with the present invention, one extending from each of his forearms such that the two claws substitute for his two hands. The elongate arms must be sufficiently long to enable the operator to grasp, pull, retain and release coils of razor ribbon without exposing his own hands and arms to contact with the barbs. In the preferred embodiment, the elongate members extend the claw of each of the manipulator arms a distance of at least nine inches from an operator's knuckles as he manipulates the device.

The device includes a sleeve formed by at least one metal ring through which the forearm of the operator extends, and a plurality of guide members for retaining the one or more rings in an orientation perpendicular to the axis of the elongate member. In the preferred embodiment, the elongate member is a tube at the distal end of which is a transverse flange extending outward of the central opening of the tube. Extending through the length of the tube is a rod that is axially moveable between an extended position and a retracted position. A coil spring or the like within the rearward end of the tube urges the rod axially outward of the tube and a stop positioned along the length of the rod engages a surface on the tube to limit the axially outward movement thereof. The distal end of the rod includes a hook, which is curved rearward so as to engage the flange at the distal end of the tube when the coil spring is compressed and the rod is in the axially retracted position. The movement of the hook against the transverse flange creates the claw useable by the operator to manipulate razor ribbon.

The device includes a handle, rigidly connected to the tube and a moveable trigger connected to the rod, which is moveable by an operator's fingers while the palm of his hands are against the handle. To use the device, the operator will place his hand through the sleeve with his palm against the handle and his fingers wrapped around the trigger, thereby retaining the axis of the tube and rod parallel to the axis of his forearm. By squeezing his fingers around the trigger, the operator will withdraw the rod within the tube and move the hook at the distal end thereof against the transverse flange thereby providing a moveable claw for grasping razor ribbon.

In the preferred embodiment, the rod is rotatable within the sleeve such that the angle at which the hook extends out the distal end is rotatable to the desired orientation. The device further includes a lock for retaining the rod in the desired orientation with respect to the sleeve.

The installation of razor ribbon typically requires a crew of at least two. One of the installers will use the manipulator arms of the present invention on each of his forearms and operate the hooks of the claws to grasp the razor ribbon and hold it in the desired orientation while the second operator uses his fingers to position and tighten wire tie-downs to hold the razor ribbon in place.

BRIEF DESCRIPTION OF THE DRAWINGS

A better understanding of the present invention will be had after a reading of the following detailed description taken in conjunction with the drawings wherein.

DETAILED DESCRIPTION OF PREFERRED EMBODIMENT

Figure 1:
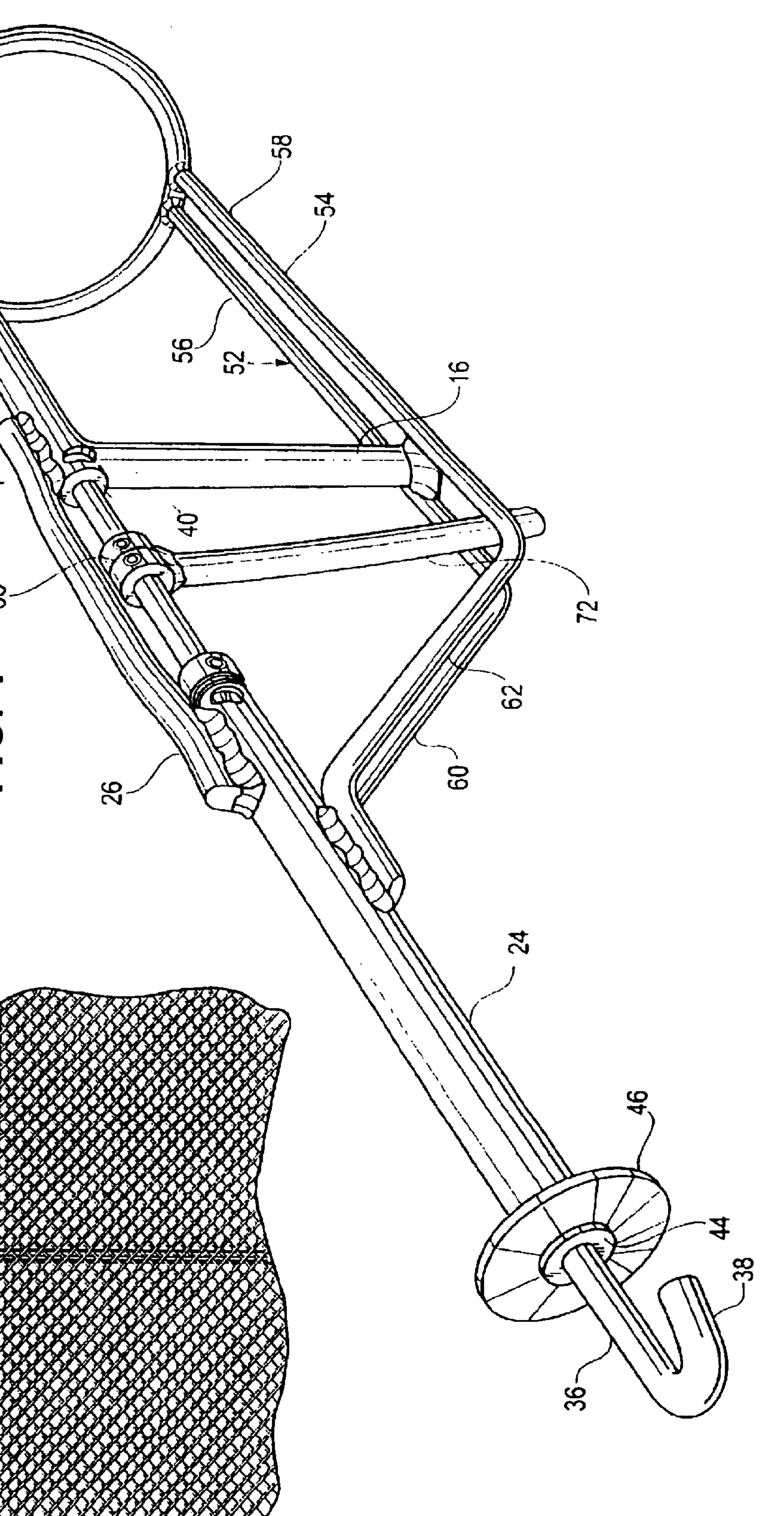
FIG. 1 is an isometric view of a manipulating hand in accordance with the invention.
Figure 3:
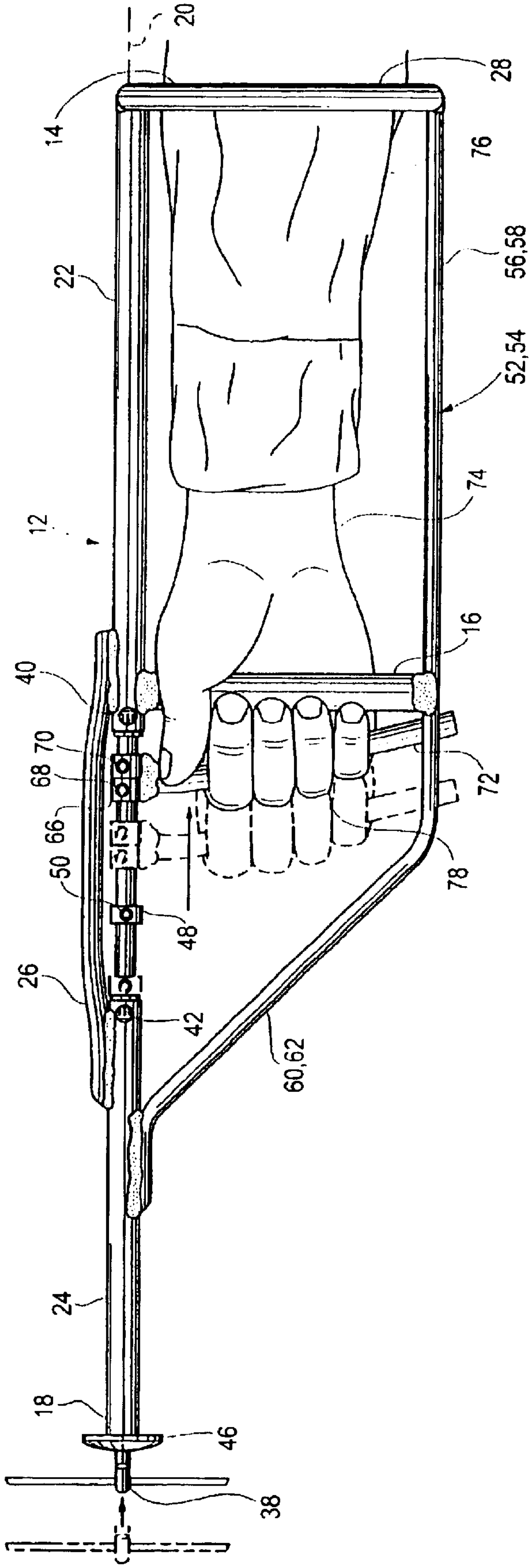
FIG. 3 is a side elevational view of the manipulating hand shown in FIG. 1 positioned on the arm of an operator.
Figure 5:
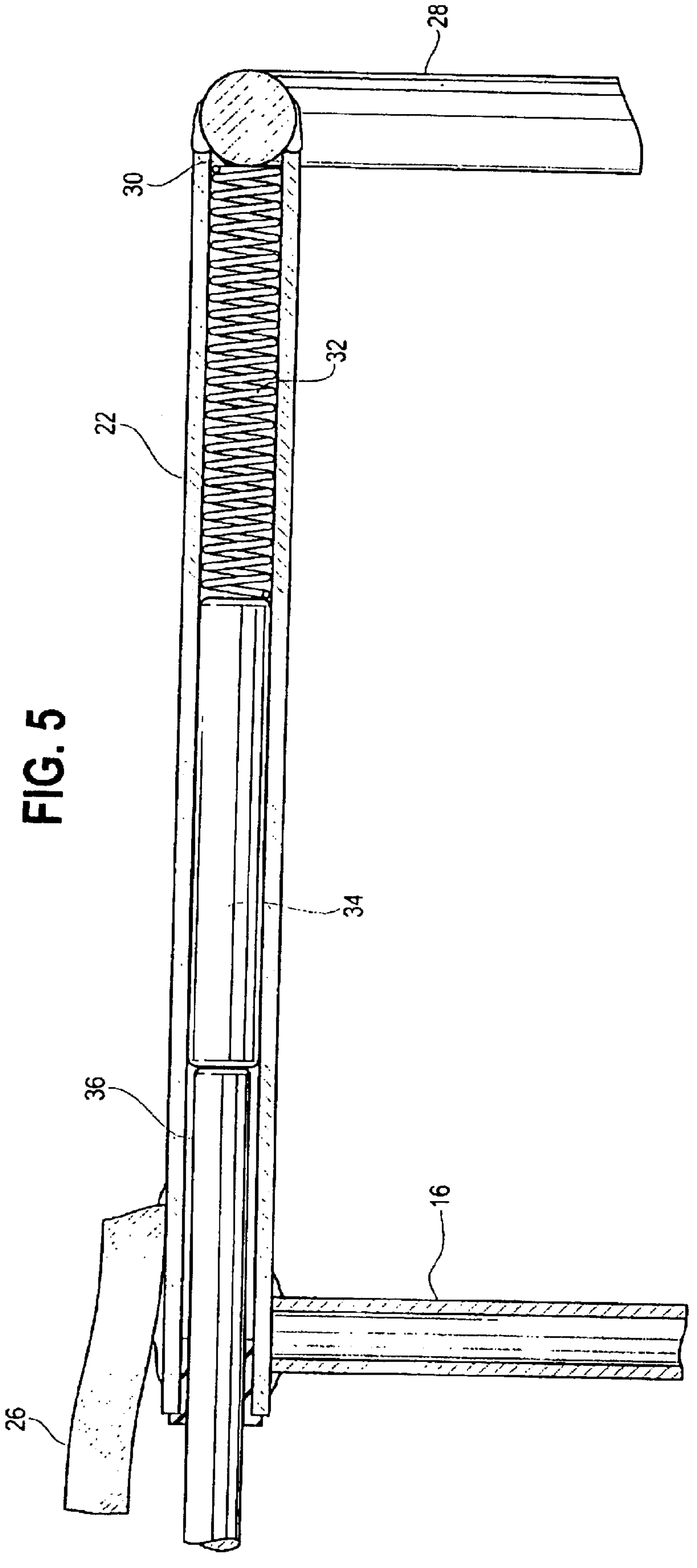
FIG. 5 is a fragmentary enlarged cross-sectional view of the manipulating arm shown in FIG. 1.

Referring to FIGS. 1, 3, and 5, a manipulating arm 10 in accordance with the present invention includes an elongate arm member 12 having an inward end 14 configured as a sleeve adapted to fit around an operator's forearm, a centrally located handle 16, and an outward end 18 some distance outward of the handle 16. For the purposes hereof, the orientation of the parts of the manipulating arm 10 will be described with respect to their orientation as shown in FIG. 3 where the axis 20 of the manipulator arm 10 extends horizontally with respect to the page and the parts that are oriented parallel to the axis 20 extending toward the inward end 14 or toward the outward end 18, and the portions orientated perpendicular to the axis 20 are vertically oriented.

The manipulating arm 10 includes two axially spaced metal tubular members 22, 24, which are retained in axial alignment by a connecting bar 26. The ends of the connecting bar 26 are welded to the outer surfaces of the tubular members 22, 24, with the ends of the tubular members 22, 24 spaced from each other by a distance of approximately four inches. The inward end of the inward tubular member 22 is welded to a metal ring 28, the inner surface of which describes a circle having a diameter of three and three-quarters to four inches and the plane of the circle scribed by the ring 28 is perpendicular to the axis 20 of the tubular members 22, 24. At the juncture between the inward end of the tubular member 22 and the ring 28, the body of the ring 28 is welded across the central opening of the tubular member 22 forming a rear surface 30 at the inward end of the tubular member 22.

Referring to FIGS. 1, 3, 4, and 5, fitted within the tubular member 22 is a coil spring 32, and outward of the coil spring 32 is a cylindrical spacer 34. Extending through the axial opening of the aligned tubular members 22, 24 outward of the spacer 34 is an operating rod 36, the outer end of which extends beyond the distal end of the outward tubular member 24 and is bent to form a hook 38. To facilitate the alignment of the rod 36 within the inner opening of the tubular members 22, 24 and permit axial movement therein, a bushing 40 is provided at the outward end of tubular member 22 and bushings 42, 44 are positioned at the inward and outward ends of tubular member 24. At the outward end of tubular member 24 is a radial flange 46, which may be a metal washer welded to the outer surface of the distal end of tubular member 24.

Positioned along the rod 36 between bushings 40 and 42 is a cylindrical stop 48 having a set screw 50 therein, which is tightened against the rod 36 to limit the outward extension of the rod 36 with respect to the tubular members 22, 24. When properly positioned, as shown in FIGS. 1 and 3, the inward end of the rod 36 retains the space of 34 against the coil spring 32, with the coil spring 32 in its expanded position (as shown in FIG. 5) and the hook 38 of the rod 36 spaced from the flange 46 as shown.

Extending parallel to the tubular members 22, 24 and spaced a distance of approximately four inches therefrom are parallel metal guides 52, 54 that are spaced from each other along their length by a distance of approximately one half inch. The guides 52, 54 each have a first portion 56, 58 that extends parallel to the tubular member 22 and have a forward angular portions 60, 62 respectively, which extend from the outward ends of the parallel portions 56, 58 to a mid-portion of tubular member 24. The inward end's of the first portions 56, 58 are welded to the ring 28 at a position approximately one hundred and eighty degrees from the welding to the inner tubular member 22.

Extending perpendicular to the axis 20 from the outward end of tubular member 22 to the parallel portions 56, 58 of the guides 52, 54 is the handle 16, the ends of which are rigidly retained by weldaments.

To control the axial movements of the rod 36 within the tubular members 22, 24, a cylindrical control member 66 is fitted around the portion of the rod 28 extending between the spaced ends of the tubular members 22, 24 and is locked against movement with respect to the rod 28 by set screws 68, 70. A trigger 72 is welded to the cylindrical control member 66 so as to extend vertically downward with the distal end thereof positioned between the parallel portions 56, 58 of the guides 52, 54 so as to retain the trigger 72 in generally parallel alignment with the handle 16 and prevent rotation of the trigger 72 around the axis 20 of the rod 28.

Figure 4:
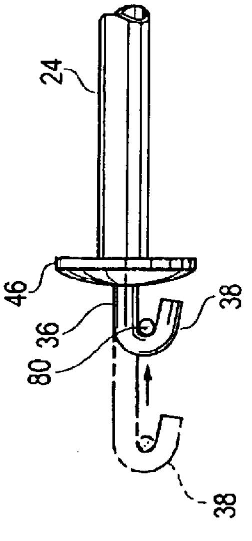
FIG. 4 is a fragmentary enlarged side elevational view of the operating end of the manipulating hand shown in FIG. 1.

Referring to FIGS. 3, 4, and 5, when the rod 28 is in the extended position as shown in broken lines in FIGS. 3, and 4, the stop 48 abuts the inward end of the outward tubular member 24, the coil spring 32 is in its expanded position and the distal end of the hook 38 is spaced from the radial flange 46. In the retracted position, as shown in solid lines in FIGS. 3 and 4, the inward end of the rod 36 will compress the coil spring 32, the trigger 72 will be moved inwardly closer to the handle 16 and the distal end of the hook 38 will abut against a portion of the radially flange 46.

The angle at which the end of the hook 38 engages the flange 46 can be rotationally adjusted by loosening the set screws 68, 70, which mount the handle 72 after which the rod 36 can be rotated about the axis 20 within the tubular members 22, 24.

Figure 2:
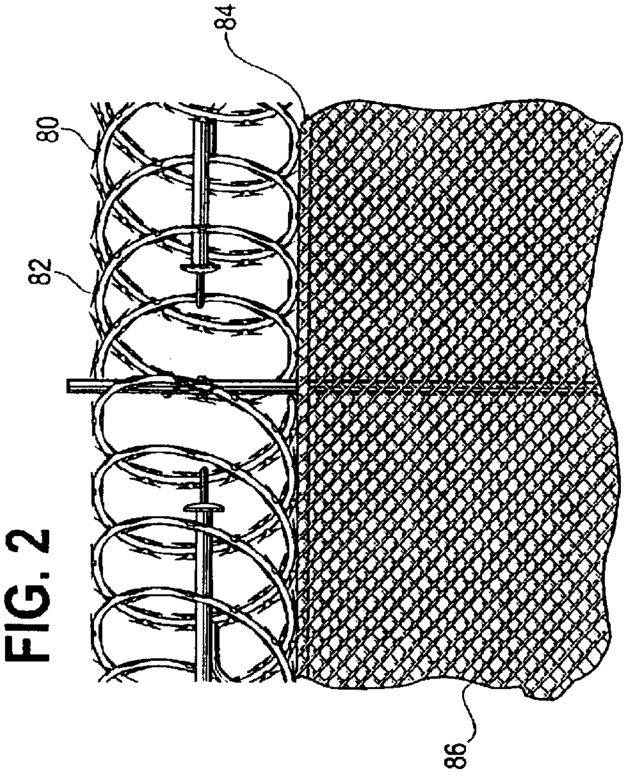
FIG. 2 is an elevational view of a length of chain link fence with razor wire along the upper edge thereof, the installation of which is facilitated by the use of manipulating hands of the type shown in FIG. 1.

Referring to FIGS. 2, 3, and 4, to operate the manipulator arm 10, an operator will extend his hand and forearm 76 through the opening of the ring 28 and position the palm 74 of his hand against the handle 16 with his four fingers 78 wrapped around the trigger 72. When the manipulator arm 10 is gripped in this fashion, the axis 20 of the tubular members 22, 24 will extend parallel to the operator's forearm 76 and the hook 38 at the outer end thereof will be spaced from the operator's fingers 78 grasping the trigger 72 by a distance determined by the length of the outward tubular member 24. In the preferred embodiment the outer end of the tubular member 24 is spaced at least ten inches from the handle 16. The operator will then use the hook 38 to wrap around a length of razor ribbon 80 having prongs 82. The operator will squeeze the trigger 72 to draw the hook 38 against the flange 46 and thereby grasp the razor ribbon 80 and move it to the desired location 84, depicted herein as on the top of a chain link fence 86, where an assistant can use lengths of wire to secure the razor ribbon 80 in its desired location 84.

While the present invention has been described with respect to a single embodiment, it will be appreciated that many modifications and variations may be made without departing from the true spirit and scope of the invention. It is therefore the intent of the dependent claims to cover all such modifications and variations, which fall within the true scope and spirit of the invention.

What is claimed:

1. A manipulating hand for handling a wire material comprising an elongate member having a longitudinal axis, means for retaining said elongate member parallel to the forearm of an operator, a rod axially moveable with respect to said elongate member between an extended position and a retracted position, a hook at a distal end of said rod, means for urging said rod to said extended position, hand operable means including a trigger for drawing said rod to said retracted position, attachment means for locking said trigger for movement with said rod, release means for releasing said attachment means from said rod wherein said hook may be rotated about said longitudinal axis while said attachment means is released from said rod, and an engagement member for engaging said hook when said hook is drawn into said retracted position.

2. The manipulating hand of claim 1 wherein said means for retaining said elongate member parallel to the forearm of an operator comprising a ring defining a plane perpendicular to said axis.

3. The manipulating hand of claim 1 wherein said means for urging said rod to said extended position is a coil spring.

4. The manipulating hand of claim 1 wherein said hand operable means comprises a handle member perpendicular to said axis wherein said trigger is moveable by a finger of an operator having a hand on said handle.

5. The manipulating arm of claim 1 wherein said engagement member is a radial flange.

6. The manipulating hand of claim 1 wherein said elongate member is a tube and said rod is axially moveable within said tube.

7. The manipulating hand of claim 6 wherein said means for urging said rod to said extended position is a coil spring within said tube.

8. The manipulating hand of claim 7 wherein said hand operable means comprises a handle member perpendicular to said axis wherein said trigger is moveable by a finger of an operator having a hand on said handle.

9. A manipulating hand for handling a wire material comprising an elongate tubular member having a longitudinal axis and an inner opening, means for retaining said tubular member parallel to the forearm of an operator, a rod axially moveable within said tubular member between an extended position and a retracted position, a hook at a distal end of said rod, a coil spring for urging said rod to said extended position, a handle perpendicular to said axis, a trigger moveable by a finger of an operator having a hand on said handle, attachment means for locking said trigger for movement with said rod, wherein said rod is axially moveable in response to movement of said trigger, an engagement member for engaging said hook when said hook is drawn into said retracted position, and release means for releasing said attachment means from said rod wherein said hook may be rotated about said axis while said attachment means is released from said rod.

10. The manipulating hand of claim 9 wherein said means for retaining said elongate member parallel to the forearm of an operator comprises a ring defining a plane perpendicular to said axis through which said forearm of said operator extends.

11. A manipulating hand for handling a wire material comprising an elongate member having a longitudinal axis, means for retaining said elongate member parallel to the forearm of an operator, a hook and an engagement member at a distal end of said elongate member, said hook moveable between a first position spaced from said engagement member and a second position abutting said engagement member, means for urging said hook toward one of said first position and said second position, means including a longitudinally moveable rod and a trigger, for moving said hook between said first position and said second position wherein said means for moving is operable by the hand of an operator the forearm of which is retained parallel to said elongate member, and release means for releaseably retaining said rod to said trigger wherein said rod and said hook may be rotated about said longitudinal axis while said trigger is released from said rod.

* * * * *